United States Patent
Dyson et al.

(10) Patent No.: US 7,090,771 B2
(45) Date of Patent: *Aug. 15, 2006

(54) FILTRATION SYSTEM UNDERDRAIN

(75) Inventors: John D. Dyson, Richmond, VA (US); Jack H. Jessop, Midlothian, VA (US); Harold W. Johnson, Jr., Midlothian, VA (US); Louis U. Brittingham, Jr., Richmond, VA (US); Gregory Matanoski, New Kent, VA (US)

(73) Assignee: Infilco Degremont, Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/672,666

(22) Filed: Sep. 26, 2003

(65) Prior Publication Data

US 2004/0055944 A1    Mar. 25, 2004

Related U.S. Application Data

(63) Continuation-in-part of application No. 10/174,273, filed on Jun. 18, 2002, now Pat. No. 6,921,481.

(60) Provisional application No. 60/414,079, filed on Sep. 27, 2003.

(51) Int. Cl.
*B01D 24/22* (2006.01)

(52) U.S. Cl. .................... 210/263; 210/264; 210/269; 210/270; 210/271; 210/274; 210/275; 210/279; 210/284; 210/286; 210/293; 210/232; 210/793; 210/794; 210/795

(58) Field of Classification Search ................ 210/274, 210/275, 279, 264, 284, 286, 293, 793, 794, 210/795, 263, 269, 270, 271, 232, 272
See application file for complete search history.

(56) References Cited

U.S. PATENT DOCUMENTS

| 2,302,450 | A | * | 11/1942 | Laughlin | 210/264 |
|---|---|---|---|---|---|
| 3,984,326 | A | * | 10/1976 | Bendel | 210/264 |
| 4,211,656 | A | * | 7/1980 | Cochrane | 210/149 |
| 5,078,873 | A | * | 1/1992 | Black et al. | 210/264 |
| 5,089,130 | A | * | 2/1992 | Nichols | 210/232 |
| 5,618,421 | A | * | 4/1997 | Sorosinski | 210/264 |
| 6,261,453 | B1 | * | 7/2001 | Savage | 210/274 |
| 6,325,931 | B1 | * | 12/2001 | Roberts et al. | 210/293 |
| 6,423,216 | B1 | * | 7/2002 | Yum et al. | 210/150 |
| 6,569,327 | B1 | * | 5/2003 | Roberts et al. | 210/274 |
| 6,569,328 | B1 | * | 5/2003 | Haggard | 210/275 |

* cited by examiner

*Primary Examiner*—Duane Smith
*Assistant Examiner*—Minh-Chau T. Pham
(74) *Attorney, Agent, or Firm*—DLA Piper Rudnick Gray Cary US LLP

(57) ABSTRACT

The invention is directed to a filter underdrain for supporting a filter media between at least two dividers forming at least one cell, which includes at least one porous plate for supporting the filter media for filtering a fluid, the porous plate spanning across at least one of the dividers; and a plurality of support members beneath the porous plate, the support members containing at least one port for draining the fluid after the fluid passes through the porous plate. The porous plates may be bound together by a lap joint and an end section may be included between at least two of the support members, the end section containing at least one pocket for holding the porous plate.

20 Claims, 14 Drawing Sheets

FILTRATION SYSTEM UNDERDRAIN

CROSS-REFERENCE TO CO-PENDING APPLICATIONS

The present application claims the priority of U.S. Provisional Patent Application Ser. No. 60/414,079, filed on Sep. 27, 2003, and U.S. patent application Ser. No. 10/174,273, filed Jun. 18, 2002, now U.S. Pat. No. 6,921,481 which are herein incorporated in their entirety by reference.

FIELD OF THE INVENTION

The field of the invention is filtration systems, and more particularly filtration systems incorporating an underdrain.

BACKGROUND

Filtration systems, such as automatic backwash traveling bridge rapid sand filters or filtration systems having a low profile underdrain, are commonly used for the treatment of municipal and industrial water supplies as well as wastewater effluents. Owners attest to the outstanding performance and economics of backwash filtration systems. In large part, the backwash filter has stayed in the forefront of treatment technology.

The conventional filter underdrain design has been in use since the late 1940's. The original design was constructed out of steel, which was changed to fiberglass in the mid 1970's. One illustration of the conventional filter design is shown in FIGS. 1(a)–(b). Conventional filter underdrain 100 consists of a series of lateral partitions 101, which divide the filter bed into a multitude of compartments 102. Each compartment is arranged for connection to a separate effluent or backwash port 103. Within each partition 101, above the ports, there is a porous plate 104.

Porous plate 104 acts as a supporting deck or ledge for filter sand media 105 in each separate compartment 102. Porous plates 104 are typically formed from a plastic, such as polyethylene, or ceramics, and are designed to support the weight of the filters and media, which is typically at a depth of 11 inches. In a typical configuration, five porous plates, each measuring 30 inches long by 12 inches wide are installed in each compartment, or cell.

The joints between each of these porous plates must be properly sealed to prevent the sand media from leaking into the effluent port area. The porous plate is typically sealed in each cell utilizing caulking. As shown in FIG. 1(b), each porous plate 104 is typically mounted to the partition and secured in place by angle 106 and mounting bolt hardware 107. The space between porous plate 104 and partition 101 is filled with caulking 108.

It has been found that the conventional design of such filtration systems has certain problems. A system is therefore needed that improves upon this conventional design.

SUMMARY OF THE INVENTION

The invention is directed to a filtration system utilizing an improved assembly system. In addition to automatic backwash filtration systems, the invention may be utilized in any number of other filtration applications, such as those using a low profile underdrain, which does not use an automatic backwash feature. The underdrain system may also be incorporated into conventional gravity and pressure filter systems in place of conventional underdrain systems such as block underdrains, nozzles underdrains, lateral underdrains.

Embodiments of the invention may include a filter underdrain for supporting a filter media between at least two dividers forming at least one cell, which includes at least one porous plate for supporting the filter media for filtering a fluid, the porous plate spanning across at least one of the dividers; and a plurality of support members beneath the porous plate, the support members containing at least one port for draining the fluid after the fluid passes through the porous plate. The porous plates may be bound together by a lap joint and an end section may be included between at least two of the support members, the end section containing at least one pocket for holding the porous plate.

BRIEF DESCRIPTION OF THE DRAWINGS

The foregoing and other aspects and advantages will be better understood from the following detailed description of the invention with reference to the drawings, in which.

DETAILED DESCRIPTION

The invention will be understood more fully from the detailed description given below and from the accompanying drawings of the preferred embodiments of the invention; which, however, should not be taken to limit the invention to a specific embodiment, but are for explanation and understanding.

As described in more detail below, the invention may include at least one influent port for introducing a fluid to the filter; a plurality of partitions forming a plurality of compartments for holding a filtering media for filtering the fluid; at least one porous plate for supporting the plurality of partitions; wherein each of the partitions is mounted atop a continuous portion of the porous plate; and at least one effluent port for draining the fluid away from the compartments. The filter may also include a filter media comprising one or more selected from the group consisting of sand, anthracite coal, and activated carbon. Filter media may also include any of the many inert and non-inert media available in the marketplace. Each of the plurality of partitions may be secured to the porous plate with angles and mounting bolts. A series of supports for the large porous plates may also be included. The large plates allow for fewer seams or joints than in the conventional porous plate block underdrain system previously described. Several possible designs for this improved underdrain system are described below and shown in the attached drawings.

The system may also be designed with and without air and/or water distribution, as described in more detail below. For example, the invention may include a traveling bridge filtration system, which incorporates an air wash sequence and equipment to prevent the media loss from an individual cell during the air wash cleaning. Alternatively, the invention may be incorporated into a low profile underdrain filtration system. Those of ordinary skill in the art will recognize, however, that the invention is not limited thereto.

Figure 1A:
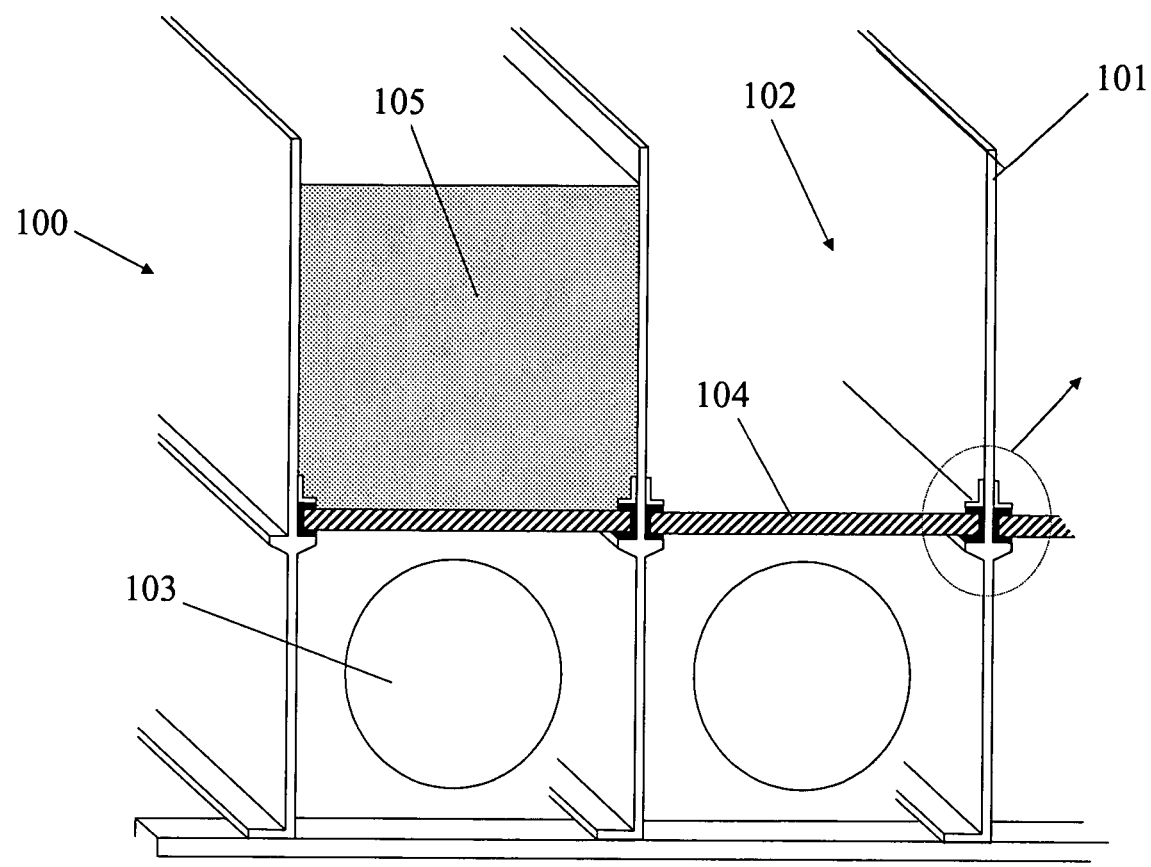
FIGS. 1(a)–(b) illustrate a conventional underdrain.
Figure 1B:
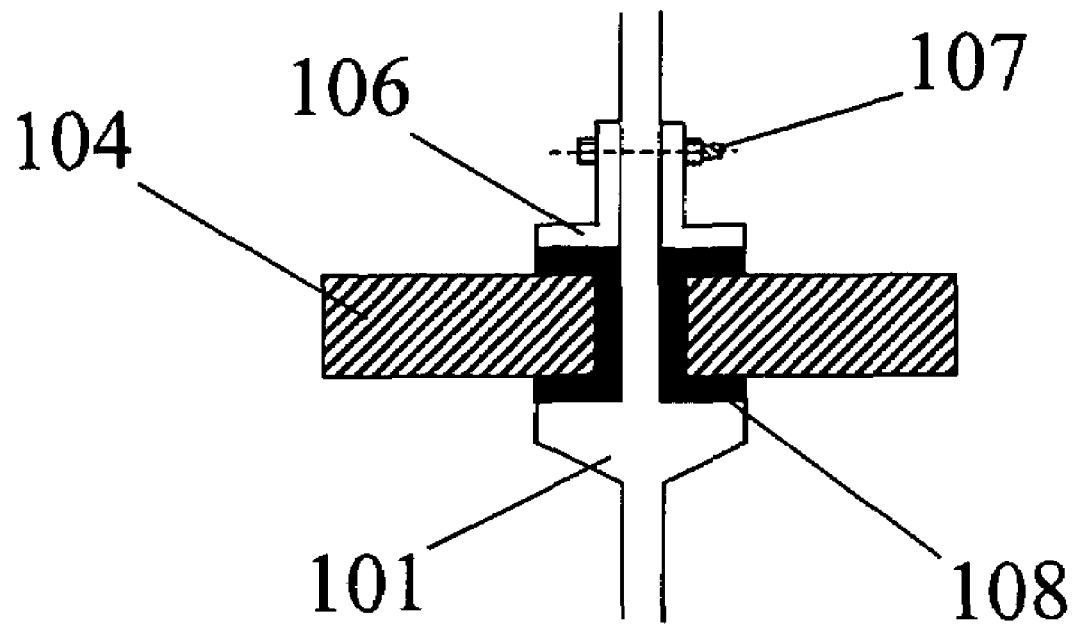
Figure 2:
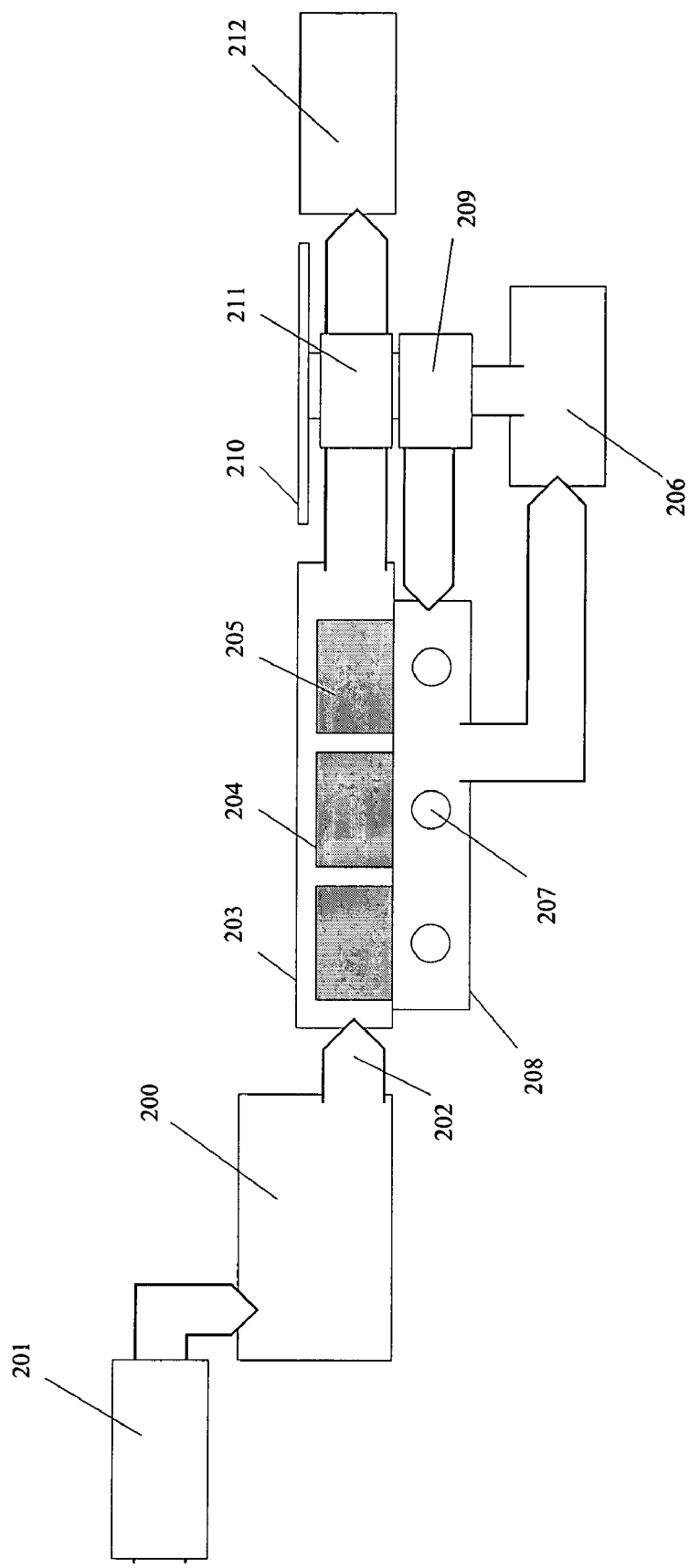
FIG. 2 illustrates a filtration system.

FIG. 2 is a general diagram illustrating the components of a water filtration system incorporating an automatic backwash filter. While the invention will be described herein in connection with an automatic backwash filtration system, those of ordinary skill in the art will appreciate that this is for purposes of illustration only, and that the invention is not limited thereto, but may be used with any filtration system. During filtration, water flows into filter tank 200 from influent channel 201, through influent ports 202, and onto filter bed 203, which contains a plurality of filter cells 204. Flow is downward through filter media 205 contained in each filter cell 204 in filter bed 203 and into effluent channel 206 through each effluent port 207 in each underdrain 208 of each filter cell 204, all in a conventional manner. The filter media is typically sand or a similar granular material, as is well known to those of skill in art.

The backwash process is usually initiated either by a predetermined head loss increase or by a preset time interval. Once initiated, the automatic backwash mechanism 209, typically suspended from a motor-driven carriage 210, draws water from the effluent channel and discharges it into the underdrain 208 of the filter cell 204 being backwashed. The backwash water expands and fluidizes media bed 205 in the filter cell 204 to release collected solids.

A washwater hood and pump 211, also suspended from the carriage 210, captures the released solids and discharge them into a washwater trough 212 to be carried away. Normally, backwash mechanism 209 moves along the entire length of the filter, backwashing each compartment in turn until all have been cleaned and the loss of head has returned to normal. All of filter cells 204, except those in the compartment being backwashed, usually remain in operation. Sufficient clean water is preferably maintained in effluent channel 206 to perform a backwash, eliminating the need for separate backwash water storage. Once carriage 210 reaches the end of filter tank 200, it typically sits with the pumps off until another backwash cycle is automatically initiated.

An automatic backwash filter typically operates at hydraulic loading rates of 2 to 3 gallons per minute per square foot. Backwash is typically initiated at a head loss increase of 2 to 6 inches over clean bed conditions. Once initiated, the backwash process typically continues from one end of the filter to the other with all cells remaining in service except the one being backwashed. Backwash typically occurs once every 2 to 6 hours, and each cell is backwashed for approximately 30 seconds. Those of ordinary skill in the art will readily appreciate, however, that the invention is not limited thereto.

The total operating head loss through the filter is typically 6 to 10 inches of water. The media in each compartment is preferably an 11-inch bed of sand, which is supported by the aforementioned plastic or ceramic porous plates. For some applications, alternative media designs such as dual sand and anthracite coal media up to 16 to 24 inches in depth or activated carbon up to 48" in depth are employed. Again, those of ordinary skill in the art will readily appreciate, however, that the invention is not limited thereto.

Backwashing is not normally carried to completion, although it may be. Regularly repeated short cleaning cycles are preferably employed to keep the media in a nearly clean condition and limit solids penetration to the upper 2 to 3 inches of the media. The presence of some material within the bed aids in the removal of particulate material during filtration. The use of the invention in this regard is not limited.

In a filtration system incorporating a low profile underdrain, an automatic backwash system is not typically employed and individual filtration cells are not used. Instead, the fluid to be cleaned fills a filtration bed, filtering down through the filter media and exiting through the underdrain. Backwashing is accomplished by taking the filtration system out of service and passing water and/or air is up through the filtration bed. Particulates and other materials released from the filter media are carried away on a trough located above the filtration bed.

Figure 3:
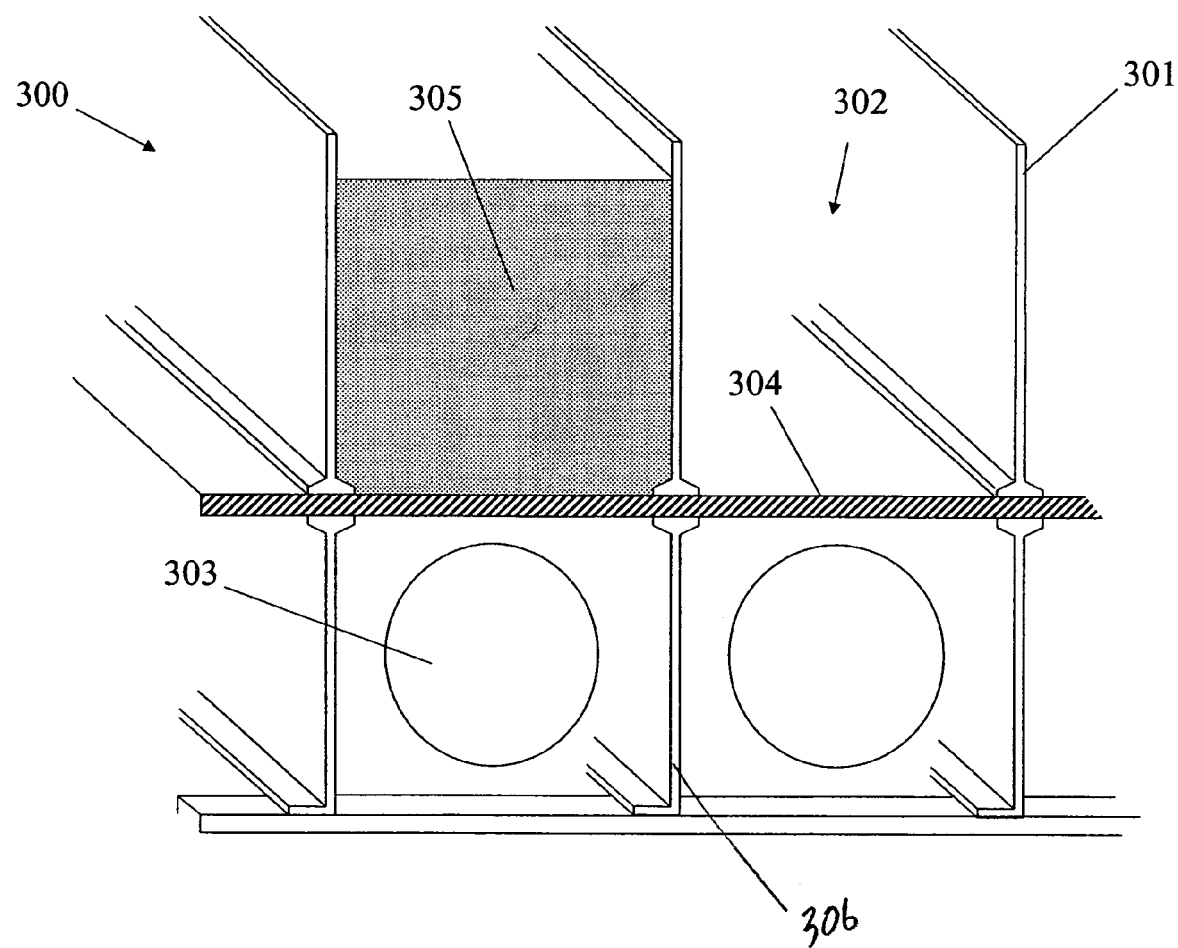
FIG. 3 illustrates an underdrain assembly.

FIG. 3 illustrates the advantages of the invention used in a generic automatic backwash filtration system. Automatic filter 300 may include a series of lateral partitions 301, which divide the filter into a plurality of compartments 302. Each compartment may be arranged for connection to a separate effluent or backwash port 303. Each partition 301 may be supported on porous plate 304. Filter sand media 305 may be filled in each compartment. Filter sand media 305 is typically, but not necessarily, filled to a depth of approximately eleven inches.

Porous plate 304 may be formed so as to be large enough to provide a media support for a plurality of cells, spanning a plurality of underdrain support members 306. In one embodiment, porous plate 304 may be approximately four feet by four feet six inches and provides support for either six eight inch cells or four twelve inch cells or other single or multiple combinations of cells.

Figure 4:
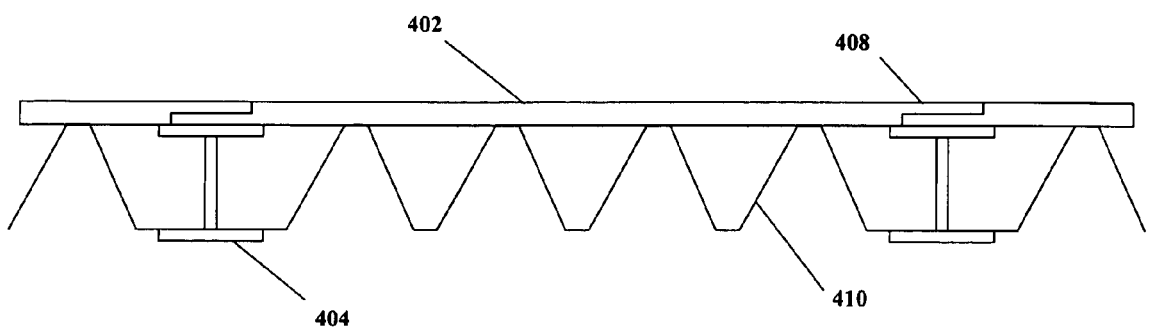
FIG. 4 illustrates a low profile underdrain.

FIG. 4 illustrates the advantages of the invention used in a generic low profile underdrain. This low profile underdrain embodiment of the invention may be used with filtration rates up to 30 gpm/sq. ft., headlosses up to 50 feet, with media depths up to 20 feet, although not limited thereto. The system may be used with and without air. There may be no need for air distribution system due to the headloss characteristics of airflow through the plate.

As shown in FIG. 4 and similar to FIG. 3 for the automatic backwash underdrain, each porous plate 402 may be supported by support members 404 at evenly spaced intervals. Porous plates 402 may be joined together at lap joint 408 to help prevent the leakage of the filter media into the underdrain. A series of air and/or water distributors 410 may be formed between each support member 404 to allow the air and/or water to flow through the system. This network of air/water distributors may comprise one or more pieces of plastic sheeting, for example, secured to porous member 402 by self-tapping screws, and which contains a plurality of inlets (not shown) to allow the air and water to pass.

This embodiment may be incorporated into existing support systems, such as the Aqurflor® form, produced by Ondeo Degremont. In this embodiment, a form, such as concrete, is utilized to support the porous plate instead of cell sheet dividers. This form may be 5 to 10 feet wide by 1 to 50 feet long, for example, but may vary and is not limited in size.

Figure 5A:
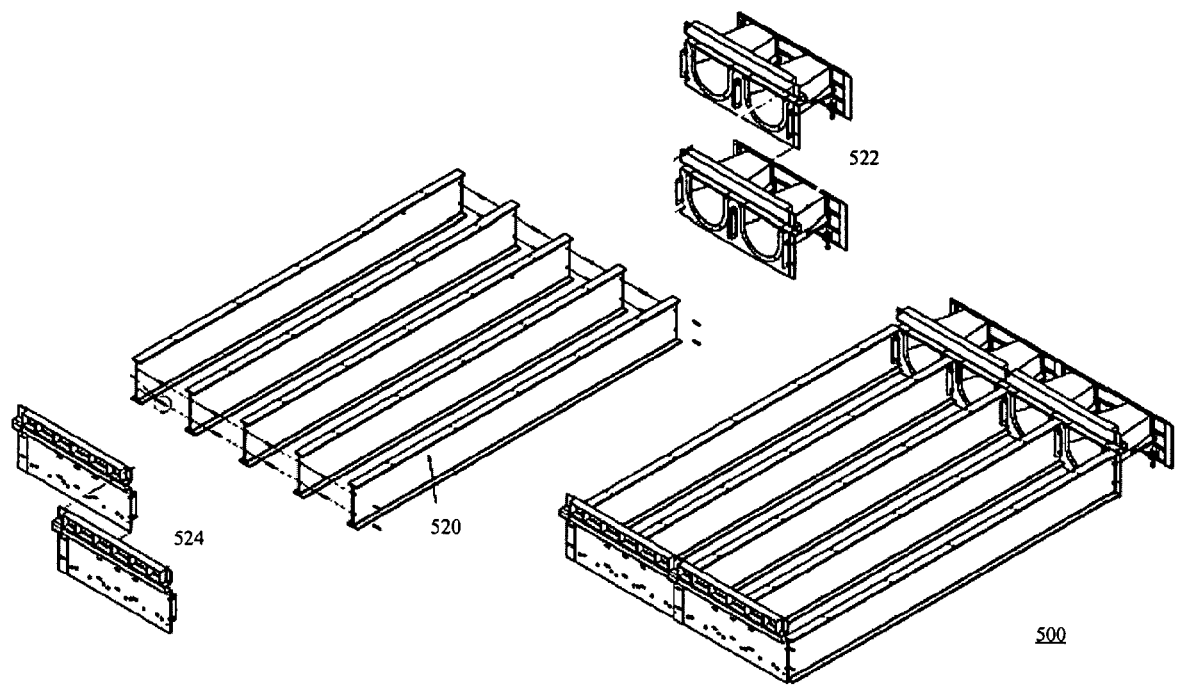
FIGS. 5(a)–(d) illustrates the assembly of an underdrain filtration system.

FIGS. 5(a)–(d) are drawings further illustrating the assembly of an underdrain filtration system. As shown in FIG. 5(a), a plurality of lower support members 520 may be aligned to be substantially parallel to each other. One or more end sections 524 may then be attached to the lower support members 520 in a conventional manner, such as by affixing them with bolts, etc. One or more drainage ports 522 may also be attached to lower support members 520 in a similar manner. The configuration of lower supports members 520, end sections 522, and drainage ports 524 may act to form the underdrain portion of filtration system 500, for carrying away the filtered fluids and for use in backwashing the filter media in the manner previously described.

Figure 5B:
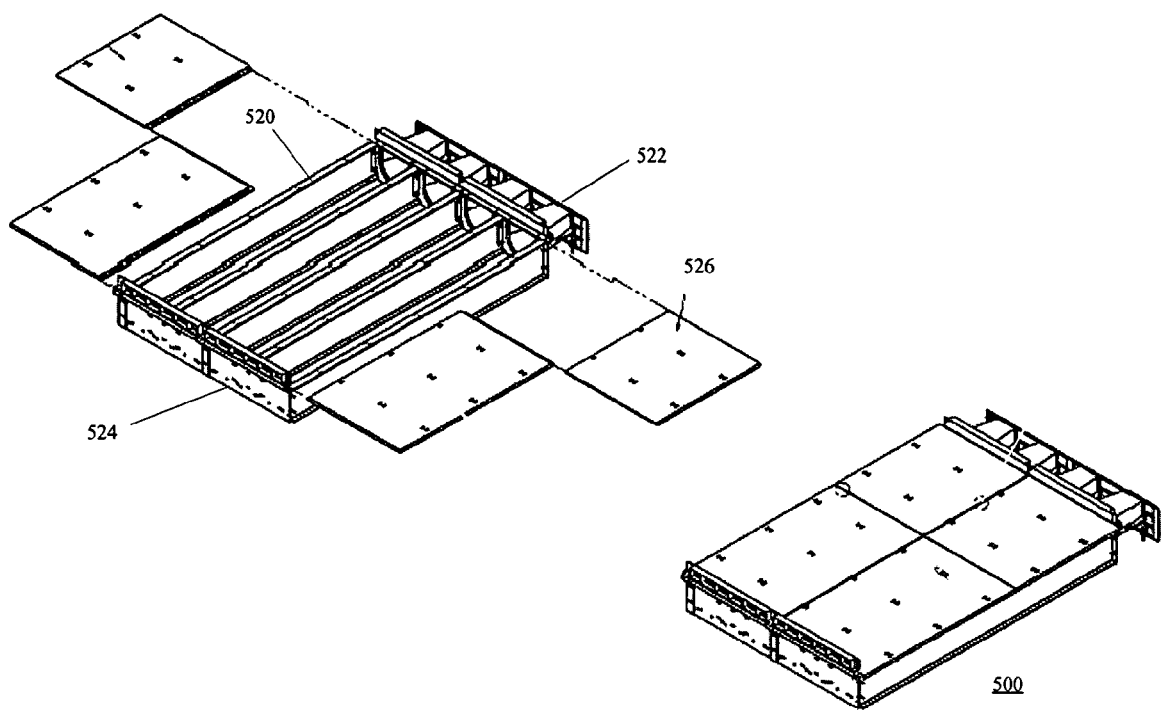
Figure 5C:
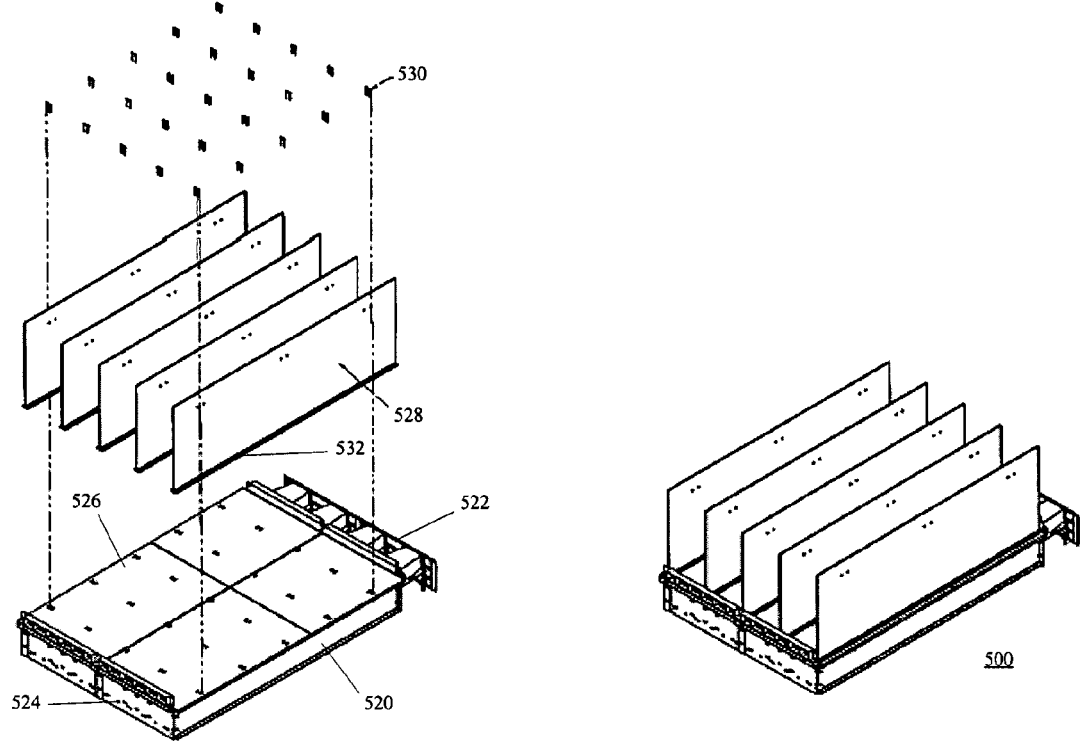
Figure 5D:
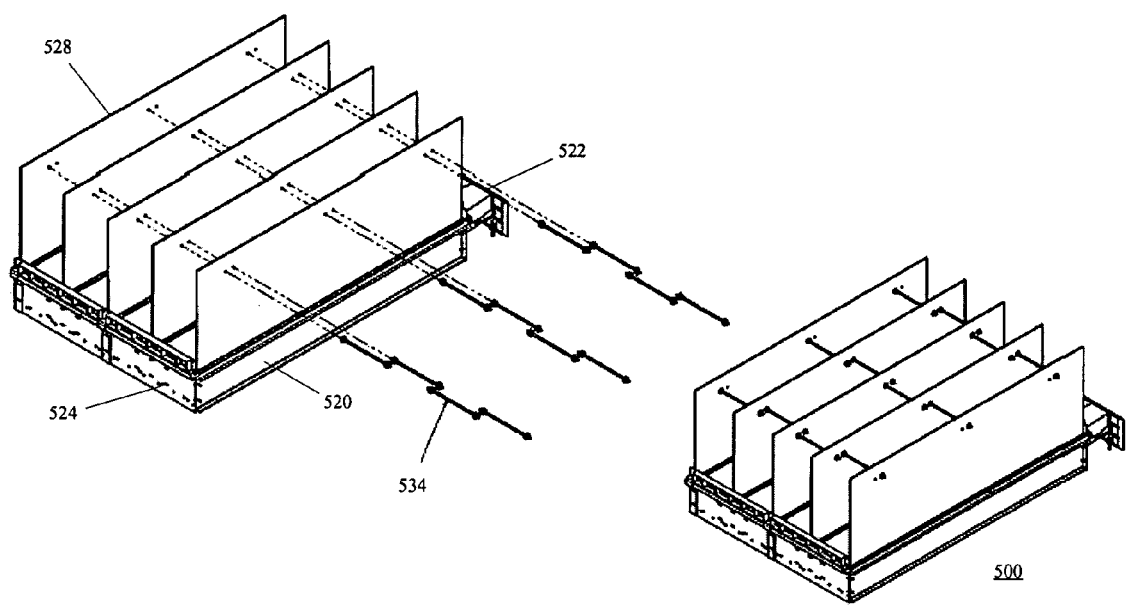

Porous plates 526 may then be mounted on top of the underdrain portion of filtration system 500 as shown in FIG. 5(b). As previously noted, porous plates 526 preferably span more than one of lower support members 520 and are connected to each other using lap joints and no caulking of seams between the plates and cell dividers is necesary. Once porous plates 526 are in place, a plurality of cell divider partitions 528 may be mounted thereon and affixed thereto using bolts 530, for example, as shown in FIG. 5(*c*). Cell partitions 528 may be mounted directly to porous plates 526, or, alternatively, may be mounted within channel members, which are in turn mounted to porous plates 526. Tie rods 534 may also be added between cell partitions 528 as shown in FIG. 5(*d*) for additional support.

Figure 6A:
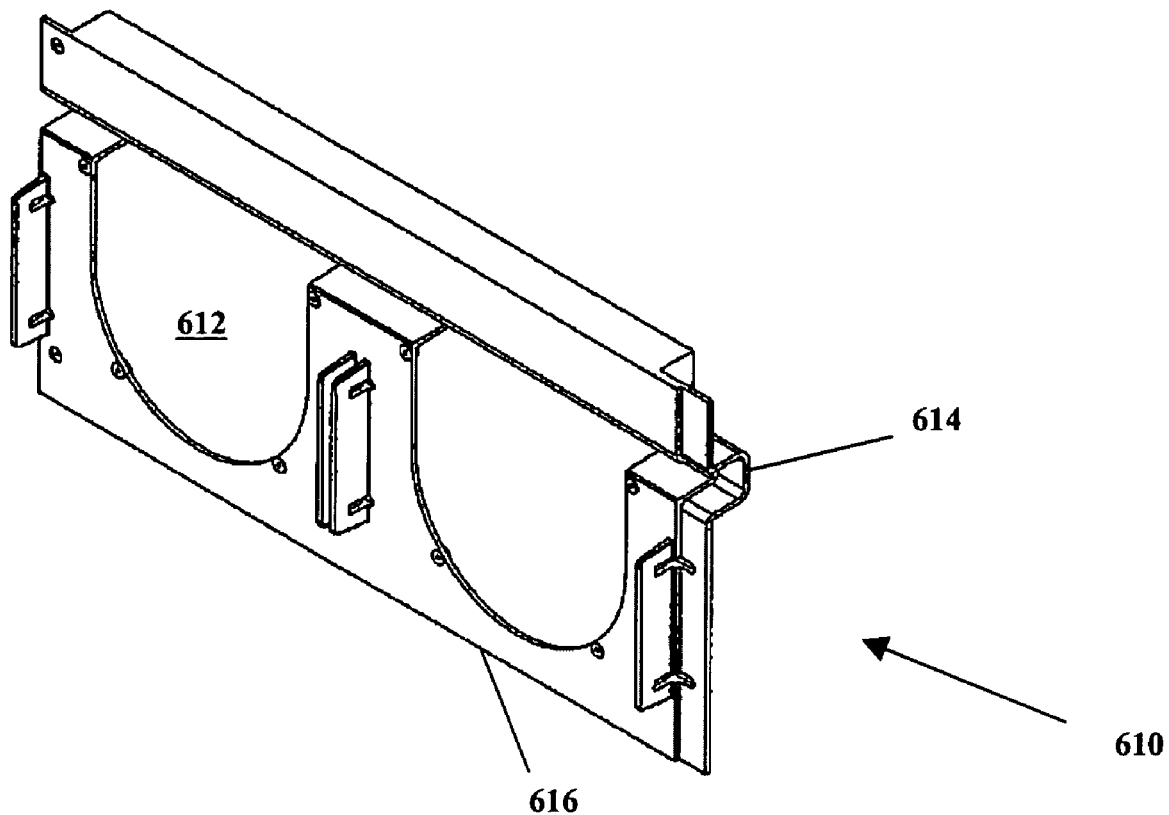
FIGS. 6(a)–(b) illustrate an underdrain drainage port.
Figure 6B:
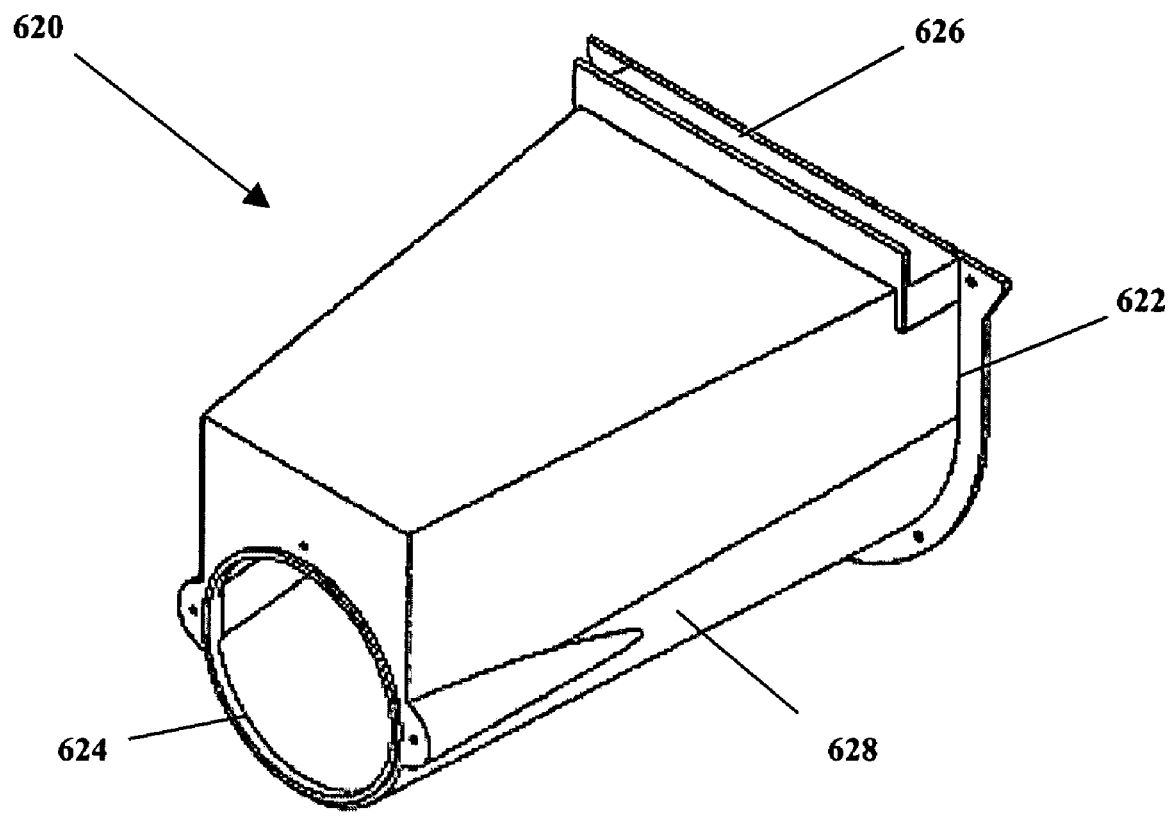

FIGS. 6(*a*)–(*b*) illustrate an embodiment of a drainage port. Port end section 610 may include a wall section 616 having one or more openings 612 therein through which fluid may pass. Port end section 610 may further include a channel or pocket 614, into which the end of porous plate 526 may be seated for additionally securing the assembly. The pocket 614 may be made from number of other materials such as c-channels, I-beams, angles and etc. on retrofit applications and/or mounted to existing concrete walls. Port drain 620 may be attached to port end section 610 for carrying fluid away from or into the underdrain. Port drain 620 may include ports 622 and 624 at either end thereof and intermediate wall section 628. The shape of intermediate wall section 628 is not particularly limited, but may be tapered in shape, and port 624 may be smaller in size than port 622. Port 622 may substantially equal in size to opening 612 of port end section 610, to which it may be attached. Port drain 620 may further include lip 626, which may fit up against pocket 614 of port end section 610.

Figure 7:
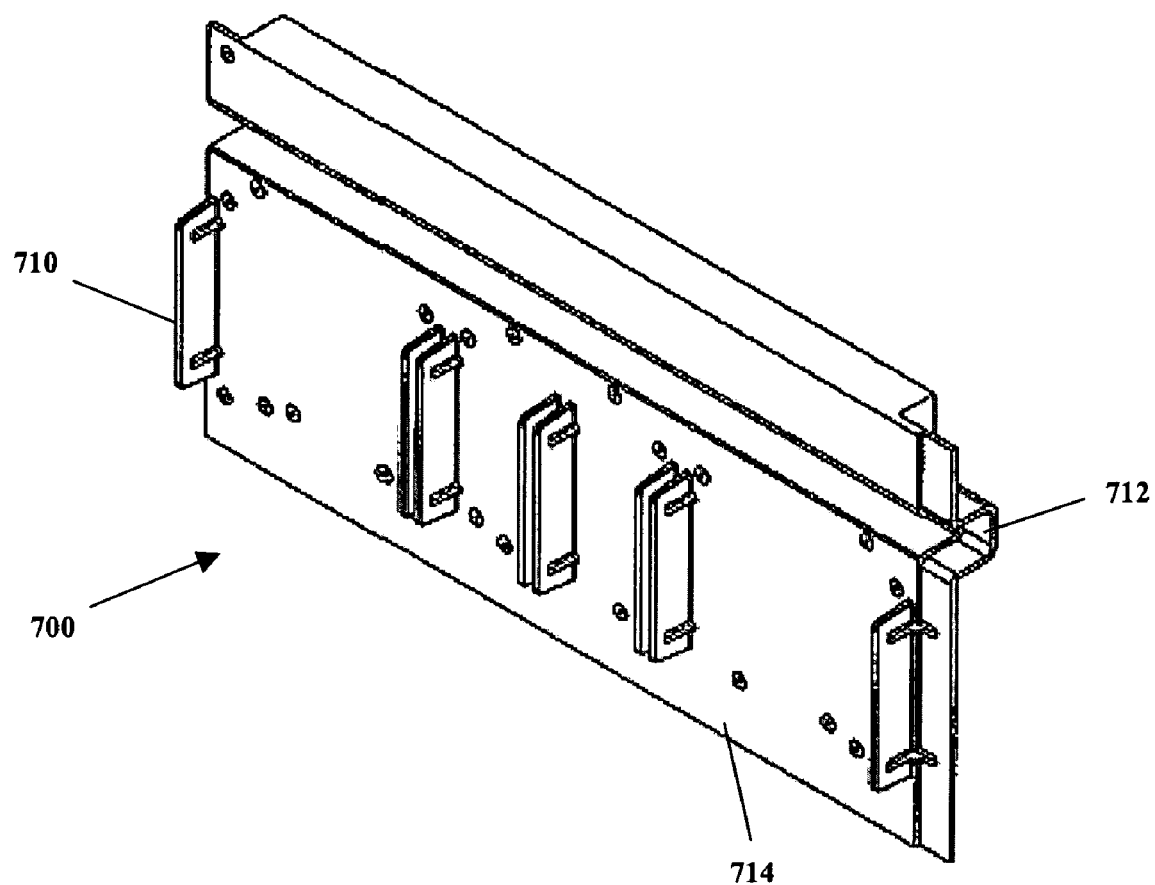
FIG. 7 illustrates an underdrain end section.

FIG. 7 illustrates an end section 700 that may be used in forming the underdrain assembly. End section 700 may include wall section 714 onto which may be mounted braces 710, which may be used for aligning, spacing and securing lower support members 520. Braces 710 may be mounted in any conventional manner, such as using bolts or the like. As with port end section 610, end section 700 may also include a channel or pocket 712 for securing porous plate 526.

Figure 8A:
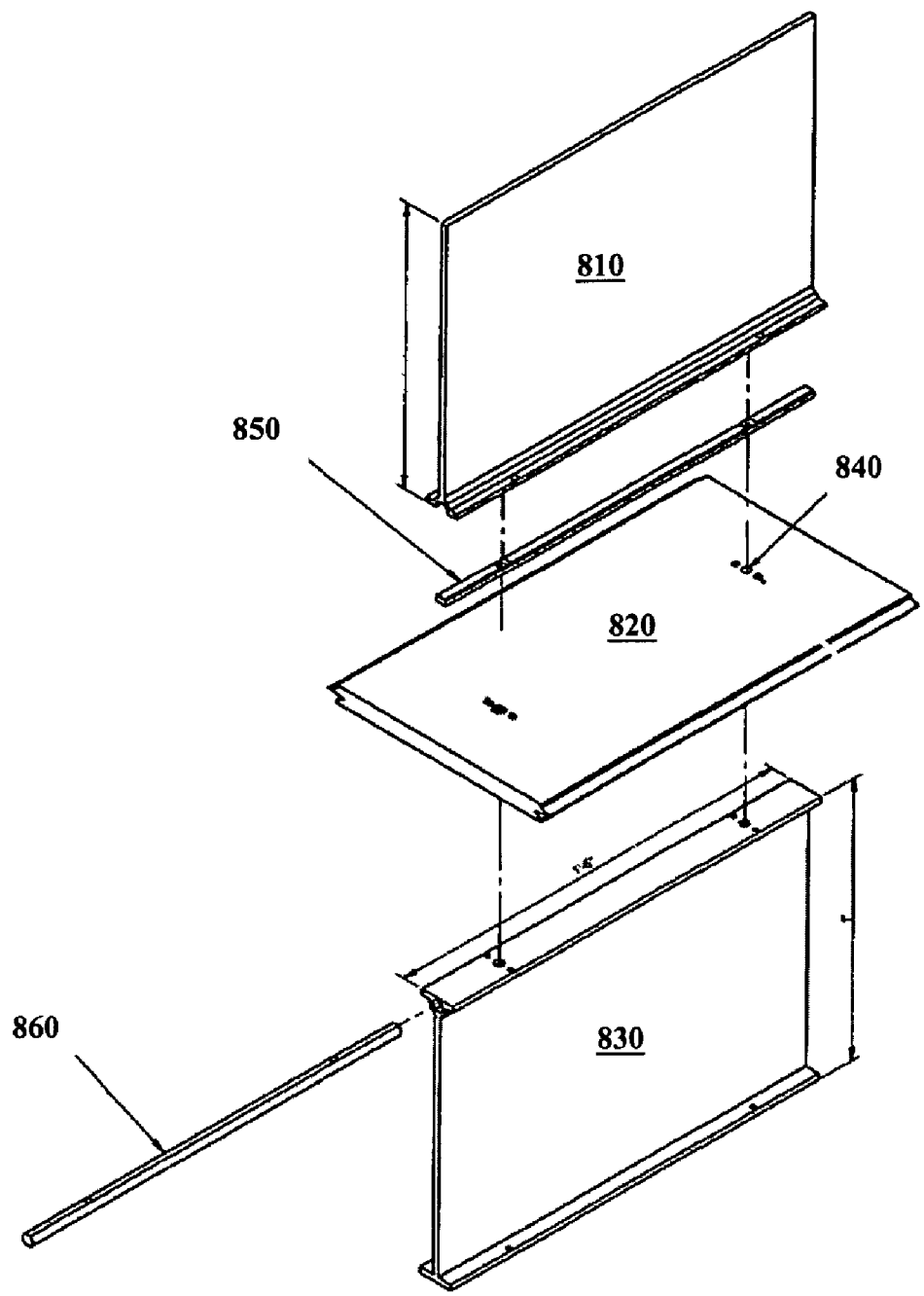
FIGS. 8(a)–(b) illustrate the assembly of cell partitions.
Figure 8B:
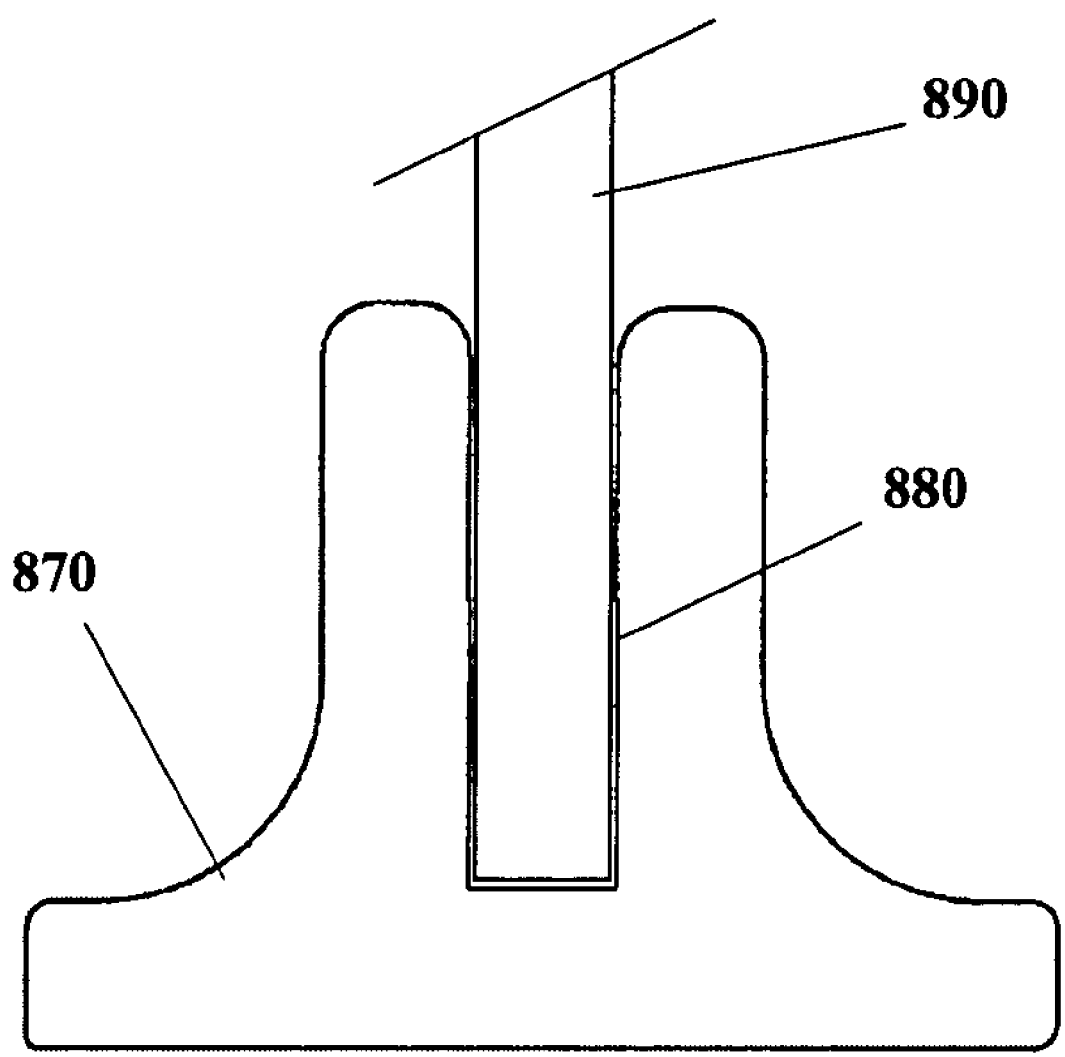

FIG. 8(*a*) illustrates an assembly of the cell partitions. Flanges on cell partitions 810 may be mounted to porous plate 820 and lower support member 830 by bolts or any other means of affixation through openings 840 in porous plate 820. SS bars 850 and 860 may also be used. Mounting cell partitions 810 to lower support member 830 through porous plate 820 has the significant advantage that the porous plate may span more than one cell and removes the need for caulking of the mount between the porous plate and the cell dividers, as in conventional systems.

An alternative to using flanges on cell partition 810 to mount it directly to porous plate 820 is illustrated in FIG. 8(*b*). As shown in FIG. 8(*b*), a cell sheet 890 may be mounted within channel 880 of channel member 870. Channel member 870 may then be mounted on the porous plate. This provides the significant advantage that the cell divider may be formed less expensively using a plate divider and a channel member.

Those of ordinary skill in the art will appreciate that there is no limitation on plate size or spacing of the underdrain supports, plates, end pieces, etc. of the invention. Depending on material thickness, any length and width of these components may be made to span large distances. Moreover, the underdrain supports may be formed into single pieces to span a large distance as with the above-mentioned Aqurflor® form.

The various components used in constructing the invention may utilize any number of materials, such as FRP, all plastics, steel, etc. For example, the porous plate may be made from plastics, wood, steel, aluminum oxide, etc. The porous plate may also be replaced with some type of screen or mesh material.

The invention has several advantages in installation, such as reduced installation labor. A low profile bottom cell divider simplifies grouting procedure. The elimination of the need for caulking saves significant installation time per cell. The use of a bolt-in top cell divider provides total access to porous plates during installation. The invention also has reduced risks. The illustrated embodiments provide for the elimination of paths for media leaks via a two-piece cell divider. The end wall pocket for the porous plate also has safety advantages. The elimination of porous plate "ledge joints" reduces risks.

The invention has enhanced underdrain strength. For example, the porous plate is continuously supported. The I-beam design for lower cell divider improves strength, as does the bolt-in porous plate. The invention also has other advantages to the end user. It is a high strength design. It has a convertible media depth by virtue of a bolt-in top cell divider. It has reduced maintenance by reduced potential for media leaks. It has direct replacement capability for existing old style design underdrains.

Although this invention has been described with reference particular embodiments, it will be appreciated that many variations may be resorted to without departing from the spirit and scope of this invention.

What is claimed is:

1. A filter underdrain for supporting a filter media between at least two dividers forming at least one cell, said filter underdrain comprising:
    at least one porous plate for supporting said filter media for filtering a fluid, said porous plate spanning across at least one of said dividers; and
    a plurality of support members beneath said porous plate, at least one of which is directly under one of the dividers, said support members containing at least one port for draining said fluid after said fluid passes through said porous plate.

2. The filter underdrain of claim 1, wherein said filter media comprises one or more selected from the group consisting of sand, anthracite coal, and activated carbon.

3. The filter underdrain of claim 1, wherein said porous plate comprises one or more materials selected from the group consisting of plastics and ceramics.

4. The filter underdrain of claim 1, further comprising a plurality of porous plates, wherein said porous plates are bound together by a lap joint.

5. The filter underdrain of claim 1, wherein said porous plate is approximately four feet by eight feet and there are six of said cells measuring about eight inches in width.

6. The filter underdrain of claim 1, wherein said porous plate is approximately four feet by eight feet and there are four of said cells each measuring about twelve inches in width.

7. The filter underdrain of claim 1, wherein each of said dividers is secured to a channel member that is secured to said porous plate.

8. The filter underdrain of claim 1, wherein said support member has an I-shaped cross-section.

9. The filter underdrain of claim 1, further comprising an end section between at least two of said support members, said end section containing at least one pocket for holding said porous plate.

10. The filter underdrain of claim 9, wherein said pocket is formed from one or more selected from the group consisting of c-channels, I-beams, and angles.

11. A filtration system for filtering a fluid comprising:
a plurality of porous plates, said porous plates being bound together to form a continuous surface;
a plurality of partitions mounted on top of said porous plates to form a plurality of compartments to receive said fluid; and
an underdrain beneath said porous plates for draining away said fluid after said fluid passes through said compartments and said porous plates, the underdrain comprising at least one support member located directly under one of the partitions.

12. The filtration system of claim 11, further comprising a filter media contained in at least one of said compartments for filtering a fluid, wherein said filter media comprises one or more selected from the group consisting of sand, anthracite coal, and activated carbon.

13. The filtration system of claim 11, wherein said porous plate comprises one or more materials selected from the group consisting of plastics and ceramics.

14. The filtration system of claim 11, further comprising a plurality of porous plates, wherein said porous plates are bound together by a lap joint.

15. The filter underdrain of claim 11, wherein each of said dividers is secured to a channel member that is secured to said porous plate.

16. The filtration system of claim 11, wherein said underdrain comprises:
a plurality of support members for supporting said porous plates;
an end section at an end of at least two of said support members; and
an end port at an end opposite said end section, wherein said said at least two support members, said end section, and said end port form an underdrain for at least one of said compartments.

17. The filtration system of claim 16, wherein said support members have an I-shaped cross-section.

18. The filtration system of claim 16, wherein said end section and/or said port further contains at least one pocket for holding said porous plate.

19. The filtration system of claim 18, wherein said pocket is formed from one or more selected from the group consisting of c-channels, I-beams, and angles.

20. A method for preparing a low profile underdrain comprising the steps of:
arranging a plurality of partitions to form a plurality of compartments for holding a filtering media for filtering a fluid;
securing said plurality of partitions on top of at least one porous plate to prevent said filtering media from passing therethough; and
arranging at least one support member directly under one of the partitions.

* * * * *